United States Patent Office 3,244,568
Patented Apr. 5, 1966

3,244,568
PRODUCTION OF PARTICULATE AMMONIUM
NITRATE-FUEL OIL EXPLOSIVE
George Reid Campbell, Saltcoats, Scotland, assignor to Imperial Chemical Industries Limited, London, England, a corporation of Great Britain
No Drawing. Filed Aug. 23, 1963, Ser. No. 304,202
Claims priority, application Great Britain, Sept. 3, 1962, 33,684/62
12 Claims. (Cl. 149—46)

This invention relates to the production of particulate ammonium nitrate particularly suitable for use in explosive compositions when admixed with fuel oil.

Such explosive compositions are finding ready application as commercial blasting agents but difficulties are often occasioned by the inability of the ammonium nitrate to take up the proportion of oil required to give an explosive having the maximum power (approximately 6 percent). For example, normal granular ammonium nitrate absorbs only about 2 percent of its own weight of oil.

Accordingly, it is an object of the present invention to provide ammonium nitrate in a form which is particularly suitable for use in ammonium nitrate/oil explosive compositions.

According to the present invention a process for the production of particulate ammonium nitrate comprises mixing substantially dry ammonium nitrate grains with water in proportions such that the water content of the mixture is not more than 10 percent by weight, at a temperature below the fusion temperature of the mixture and for a time sufficient to dissolve a surface portion of the grains and thereafter drying the resulting mixture under conditions which preclude complete dissolution of the grains. If the mixing time is insufficient to dissolve the relatively hard, impervious surface portion of the grains, the oil absorption capacity of the product will be lower than is desirable.

The water may be added either as such or as an aqueous ammonium nitrate solution. In either case, after the ammonium nitrate grains and the water have been thoroughly mixed, the water is saturated with ammonium nitrate at the temperature of the mixture. It is preferred to add the water in the form of a concentrated solution of ammonium nitrate at the temperature of mixing, so that the amount of the original grain dissolved is kept small. The ammonium nitrate added in the concentrated solution is recovered in the final product, the grains of which are consequently larger than they would be if the ammonium nitrate was wetted with water alone.

The mixing stage is conveniently carried out either at ambient temperatures using cooled ammonium nitrate or at a somewhat elevated temperature using warm freshly manufactured ammonium nitrate. A wetting time of between 10 and 20 minutes has been found to give the best product. During drying the temperature of the mixture should not be increased sufficiently to cause excessive dissolution of the grains in the water. If the drying medium is hot air used in a counter current drying system, it is possible to use air which is initially at a higher temperature than the fusion temperature of the mixture since it only contacts relatively dry grains when at its initial temperature. Dissolution of the grains may be reduced by adding to the mixture, before drying, a quantity of the already dried product consisting, for example, of an undesirably fine fraction of the granular product. These added product grains are thereby increased in size and the yield of large particles is improved. The drying is preferably carried out in a rotary drier since this results in the product being rounded grains which have attractive flow properties.

With the normally available grades of crystalline ammonium nitrate satisfactory products are obtained when the water content of the mixture is 7.5 percent and this appears to be the optimum water content. Similar products may, however, be obtained by using less water and prolonging the mixing time.

Mixing ammonium nitrate grains for at least 15 minutes with a quantity of hot saturated solution of ammonium nitrate such as to give a 7.5 percent water content in the mixture and drying in a rotary drier, gives a product which will absorb more than 6 percent of oil leaving the surface of the granules essentially dry, and of which the bulk density is at least 20 percent less than that of the starting material. This product handles well in compressed air loading apparatus and possesses satisfactory explosive properties when treated with oil.

The invention is further illustrated by the following examples in which all parts and percentages are by weight.

Example 1

85 parts of a spray-crystallised ammonium nitrate and 15 parts of a 50 percent aqueous solution of ammonium nitrate were mixed in a rotating paddle mixer for 15 minutes. The resulting mixture, together with about 15 parts of the fraction of product material passing a 20 mesh B.S. sieve, was fed in a uniform continuous manner to a rotary drier and dried with a countercurrent of air having an inlet temperature of approximately 120° C. The dried product was roughly screened on B.S. 6 and B.S. 20 mesh sieves and the fraction retained on a 6 mesh B.S. sieve was used to prepare concentrated ammonium nitrate solution for further use. The fraction passing B.S. 20 mesh sieve was added to the drier as previously described. The product retained on the B.S. 20 mesh sieve consisted of rounded grains and had the following particle size analysis and bulk density. The corresponding analysis and density of the ammonium nitrate grains used as starting material is also given for comparison.

|  | Starting Material | Product |
|---|---|---|
| Percent passing: |  |  |
| B.S. 8 mesh |  | 98.8 |
| B.S. 12 mesh | 90 |  |
| B.S. 16 mesh |  | 14.1 |
| B.S. 22 mesh | 25 |  |
| B.S. 30 mesh | 11 | 3.8 |
| B.S. 48 mesh | 5 |  |
| Bulk density at 25 p.s.i. _____ g./cc. | 1.00 | 0.77 |

100 parts of the product absorbed and retained without substantial exudation 10.5 parts of diesel oil. When 94.5 parts of the product were mixed with 5.5 parts diesel oil the resulting explosive mixture had a power of 82 percent blasting gelatine and when suitably primed propagated detonation satisfactorily.

Example 2

88 parts of a finer grade of spray-crystallised ammonium nitrate than that used in Example 1 were mixed in a paddle mixer with 12 parts of an aqueous solution of ammonium nitrate containing 6 parts of ammonium nitrate and 6 parts of water for 15 minutes. The resulting mixture was spread on trays and dried in an air oven at 45° C. for 14 hours. The resulting friable cake was broken down by rubbing through a B.S. 6 mesh sieve. The product had the following particle size analysis and bulk density. The corresponding analysis and density of the ammonium nitrate used as starting material is also given for comparison.

|  | Starting Material | Product |
|---|---|---|
| Percent passing: |  |  |
| B.S. 30 mesh | 98.7 | 85.5 |
| B.S. 44 mesh | 93.7 | 48.5 |
| B.S. 60 mesh | 89.0 | 25.0 |
| B.S. 100 mesh | 29.7 | 6.8 |
| Bulk density at 20 p.s.i. | 0.97 | 0.73 |

100 parts of the product absorbed and retained without substantial exudation of 9.5 parts of diesel oil. When 94.5 parts of the product were mixed with 5.5 parts of diesel oil the resulting explosive product had explosive properties similar to those of the explosive described in Example 1.

*Example 3*

88 parts of a coarse grade granulated ammonium nitrate were mixed with 15 parts of a 50 percent aqueous solution of ammonium nitrate for 15 minutes. To this mixture was added about 15 parts of the fraction of product material which passed a 22 mesh B.S. sieve and the whole was dried in a continuous manner in a rotary drier with a countercurrent flow of air having an inlet temperature of about 120° C.

The dried product was roughly screened on B.S. 8 mesh and B.S. 22 mesh screens and the small fraction retained on the B.S. 8 mesh sieve was used in the preparation of aqueous solution for further use, whilst the fraction passing the 22 mesh B.S. sieve was added to the wetted mixture as already described. The starting materials and the product passing an 8 mesh B.S. sieve and retained on a 22 mesh B.S. sieve had respectively the following characteristics:

|  | Starting Material | Product |
|---|---|---|
| Percent passing: |  |  |
| B.S. 8 mesh | 99 | 99 |
| B.S. 14 mesh | 69.8 | 60.2 |
| B.S. 22 mesh | 17.5 | 12.6 |
| B.S. 30 mesh | 0.3 | 0.2 |
| Bulk density at 25 p.s.i. g./cc. | 1.0 | 0.78–0.80 |
| Moisture percent | 0.1 | 0.1 |
| Oil absorption | 2.5 | 7–9 |

When 94.5 parts of the product were mixed with 5.5 parts of diesel oil the resulting explosive product had explosive properties similar to those quoted in Example 1.

What is claimed is:

1. A process for the production of an explosive composition which comprises:
   (A) mixing substantially dry ammonium nitrate grains with an aqueous ammonium nitrate solution in proportions such that the water content of the mixture is not more than 10% by weight, at a temperature below the fusion temperature of the mixture and for a time sufficient to dissolve a surface portion of the grains,
   (B) thereafter drying the resulting mixture with a hot drying medium under conditions which preclude complete dissolution of the grains, and
   (C) thereafter impregnating the dried mixture with from about 5 to 10% by weight of fuel oil.

2. The product produced by the process of claim 1.

3. A process for the production of an explosive composition which comprises:
   (A) mixing substantially dry ammonium nitrate grains with water in proportions such that the water content of the mixture is not more than 10% by weight, at a temperature below the fusion temperature of the mixture and for a time sufficient to dissolve a surface portion of the grains, so that the water is saturated with ammonium nitrate after thorough mixing,
   (B) thereafter drying the resulting mixture with a hot drying medium under conditions which preclude complete dissolution of the grains, and
   (C) thereafter impregnating the dried mixture with from about 5 to 10% by weight of liquid hydrocarbon fuel.

4. The process of claim 3 wherein the liquid hydrocarbon fuel is liquid petroleum fuel.

5. The process of claim 3 wherein the liquid hydrocarbon fuel is fuel oil.

6. A process in accordance with claim 3 in which the water is in the form of a concentrated solution of ammonium nitrate at the temperature of mixing.

7. A process in accordance with claim 3 which comprises wetting the ammonium nitrate grains with the water for a time of between 10 and 15 minutes.

8. A process in accordance with claim 3 in which a hot air drying medium is used in a counter current drying system.

9. A process in accordance with claim 8 in which the air is initially at a higher temperature than the fusion temperature of the mixture of ammonium nitrate and water.

10. A process in accordance with claim 3 in which a quantity of the already dried product is added to the ammonium nitrate/water mixture before drying.

11. A process in accordance with claim 3 in which the drying is effected by circulation in warm air.

12. The product produced by the process of claim 3.

References Cited by the Examiner

UNITED STATES PATENTS

| 2,125,161 | 7/1938 | Hauff et al. | 23—103 |
| 2,590,054 | 3/1952 | Taylor et al. | 149—2 |
| 3,009,801 | 11/1961 | Blackwell | 149—60 X |
| 3,103,457 | 9/1963 | Grossmann | 149—46 |

LEON D. ROSDOL, *Primary Examiner.*

BENJAMIN R. PADGETT, CARL D. QUARFORTH,
*Examiners.*

A. G. BOWEN, *Assistant Examiner.*